United States Patent [19]

Coe et al.

[11] 4,442,716

[45] Apr. 17, 1984

[54] ELECTRONIC SCANNING PRESSURE MEASURING SYSTEM AND TRANSDUCER PACKAGE

[75] Inventors: Charles F. Coe, Los Altos; Gilbert T. Parra, Sunnyvale, both of Calif.

[73] Assignee: The United States of America as represented by the Administrator of the National Areonautics and Space Administration, Washington, D.C.

[21] Appl. No.: 373,771

[22] Filed: Apr. 30, 1982

[51] Int. Cl.$^3$ .......................... G01L 9/06; G01M 9/00
[52] U.S. Cl. ........................ 73/756; 73/147;
    73/721; 340/870.13
[58] Field of Search .......... 73/756, 147, 4 R, DIG. 4,
    73/721, 727; 340/870.13, 870.11; 338/4

[56] References Cited

U.S. PATENT DOCUMENTS

| | | | |
|---|---|---|---|
| 4,111,058 | 9/1978 | Gross | 73/147 |
| 4,146,750 | 3/1979 | Spiesman | 340/870.13 |
| 4,222,277 | 9/1980 | Kurtz et al. | 73/721 |
| 4,373,397 | 2/1983 | Keller | 73/721 |

*Primary Examiner*—Donald O. Woodiel
*Attorney, Agent, or Firm*—Darrell G. Brekke; John R. Manning

[57] ABSTRACT

This electronic scanning pressure system includes a plurality of pressure transducers (60). A means (22) obtains an electrical signal indicative of a pressure measurement from each of the plurality of pressure transducers (60). A multiplexing means (12) is connected for selectively supplying inputs from the plurality of pressure transducers (60) to the signal obtaining means (22). A data bus (10) connects the plurality of pressure transducers (60) to the multiplexing means (12). A latch circuit (16) is connected to supply control inputs to the multiplexing means (12). An address bus (14) is connected to supply an address signal of a selected one of the plurality of pressure transducers (60) to the latch circuit (16). In operation, each of the pressure transducers (60) is successively scanned by the multiplexing means (12) in response to address signals supplied on the address bus (14) to the latch circuit (16). The electronics of this system is desirably incorporated along with the pressure transducers (60) in a package (50), which contains an array of the pressure transducers (60), a sealed reference chamber (140) and a heater (54). This package may in turn be incorporated in a complete system including an A/D converter (302) and a plurality of the packages (50) connected to the A/D converter (302) by cables (300). The A/D converter is connected to a data processor (304) by a cable (306).

13 Claims, 9 Drawing Figures

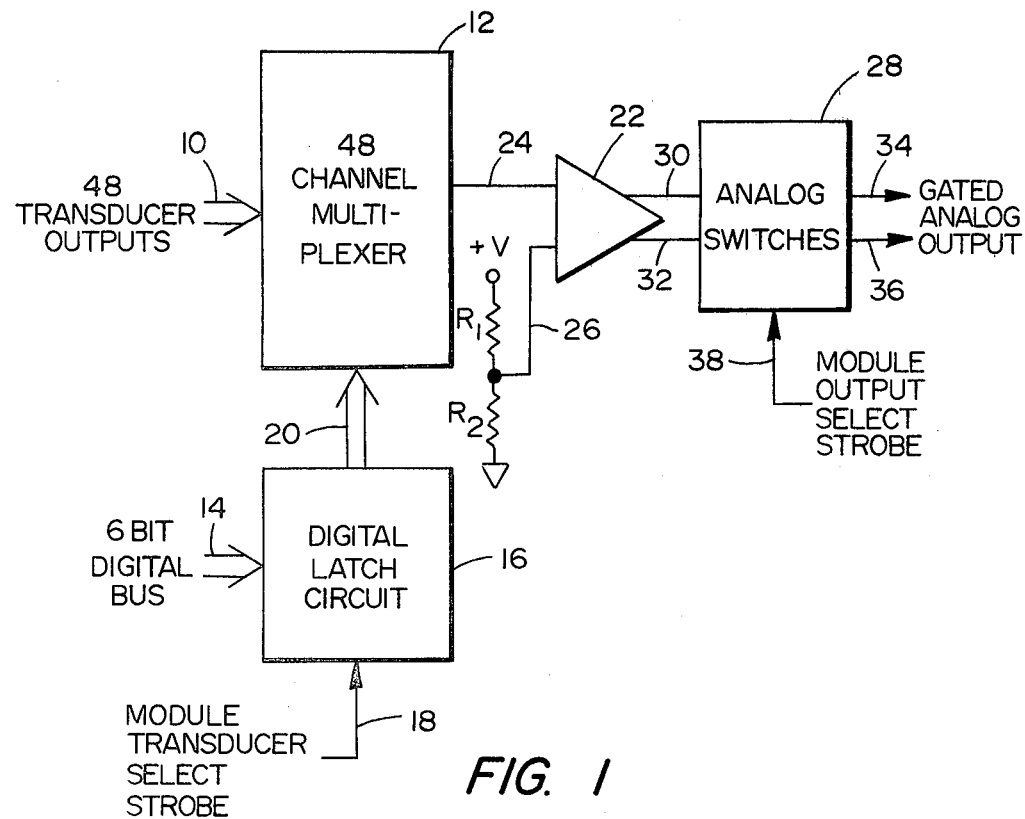
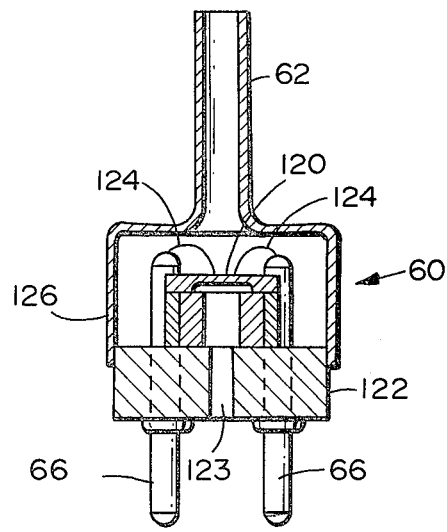
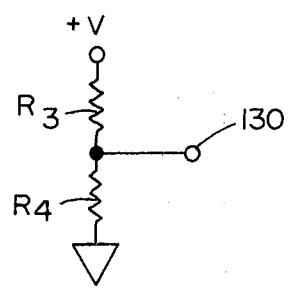

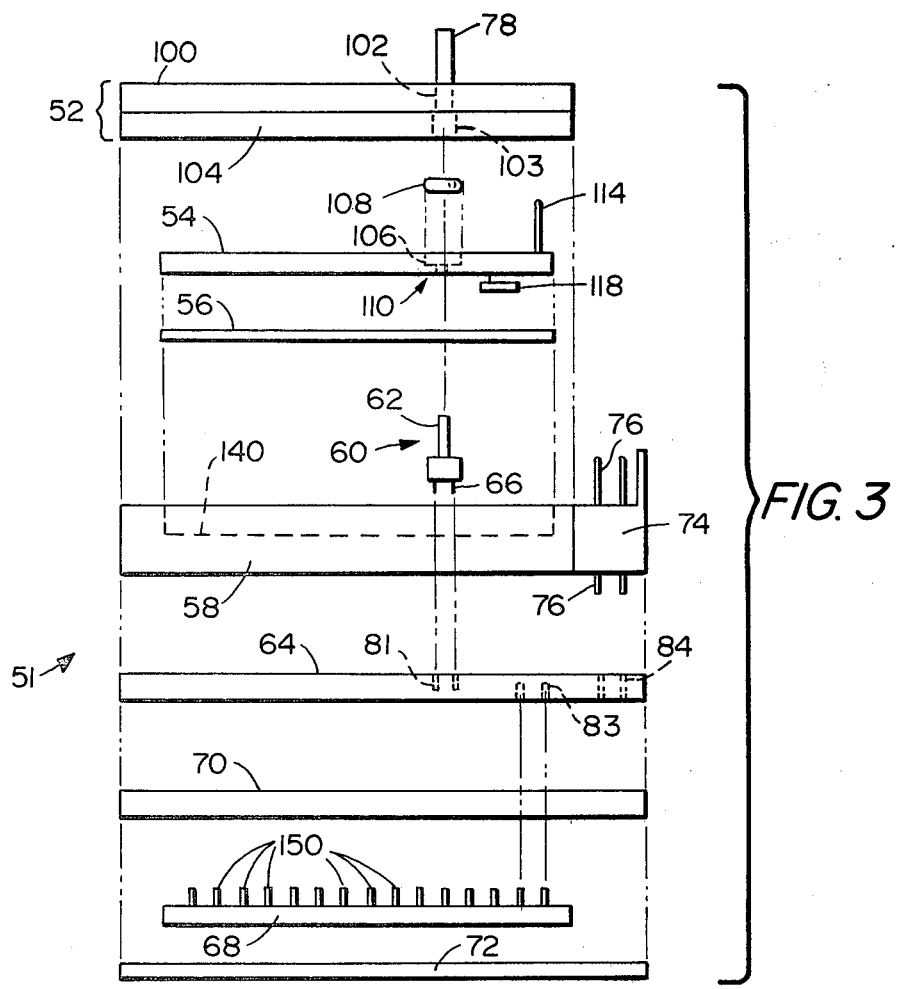
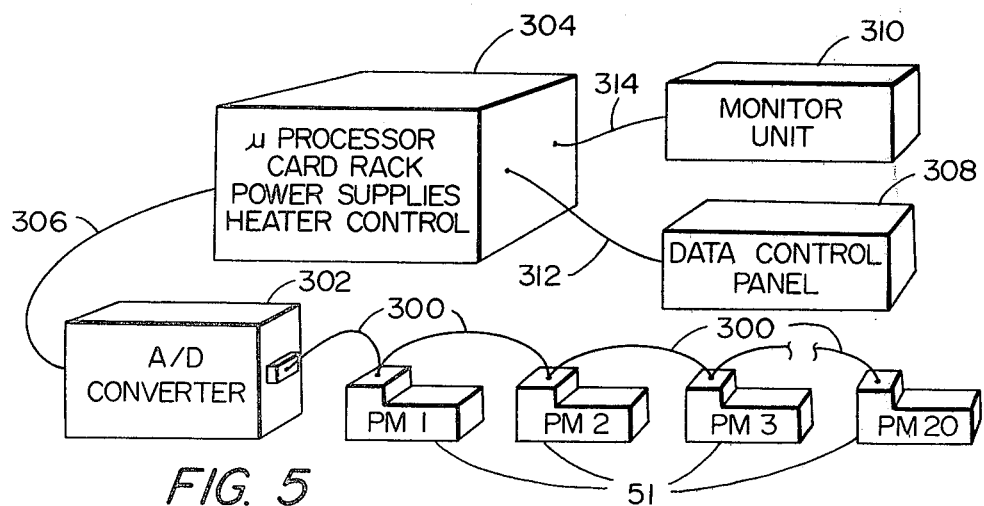

ELECTRONIC SCANNING PRESSURE MEASURING SYSTEM AND TRANSDUCER PACKAGE

ORIGIN OF THE INVENTION

The invention described herein was made by employees of the U.S. Government and may be manufactured and used by or for the Government for governmental purposes without the payment of any royalties thereon or therefor.

FIELD OF THE INVENTION

This invention relates to an improved system for measuring pressures with a plurality of transducers and a package for components of the system. More particularly, the invention relates to such a system which is especially adapted for use in measuring a multiplicity of measurements rapidly and reliably, in such environments as wind tunnels and similar demanding situations.

DESCRIPTION OF THE PRIOR ART

Prior to the relatively recent introduction of electronically scanned pressure modules, multiple steady and quasi-steady pressures on wind tunnel models have been routinely measured using electromechanical scanning devices. Such electromechanical scanners are relatively small. They can be installed inside many models. They provide pressure measurement accuracy. However, such electromechanical scanners tend to be scan speed limited by their pneumatic volume and its associated relatively long settling time, and also by speed limitations of the mechanical drive. Further, there are reliability problems with such systems. The length of time between mechanical breakdowns of such systems is dependent on the cleanliness of the test environment. Service of such units is interrupted frequently to repair or replace the pneumatic switches, which are susceptible to leaks.

Even with the advent of electronically scanned pressure modules, systems incorporating such modules have hitherto still relied on pneumatic switching for pressure measurements, for calibration, and for obtaining base line measurements.

The state of the prior art in such pressure measuring transducers is shown in the following references:

U.S. Pat. Nos. 2,761,319; 2,957,345; 3,326,046; 3,645,141; 4,108,008; 4,111,058; 4,133,022; and 4,204,422.

Juanarena, D. B., A Multiport Sensor and Measurement System for Aerospace Pressure Measurements, Instrument Society of America. Twenty-fifth International Instrumentation Symposium, Anaheim, Calif., May 7-10, 1979; Scanivalve, Inc., Catalog S, P.O. Box 20005, San Diego, Calif. 92102; Pemberton, J. C., History of Using Mass Produced Pressure Transducers with Insitu Calibration Valving, Twenty-sixth International Instrumentation Symposium, Seattle, Wash., May 5-8, 1980.

Because wind tunnel test time is extremely costly, reliability and ease of replacement are important in pressure measuring devices used in wind tunnels. Another factor which makes wind tunnel testing a demanding environment for multiple pressure measuring systems is a substantial increase in ambient temperature during the testing. This temperature increase causes difficulty with calibration of many measuring devices. Thus, while the art of such pressure measuring systems is a highly developed one, there is still a need for increasing speed, reliability, ease of replacement, and calibration for operation under varying ambient temperatures in the operation of multiple pressure measuring systems, especially in a wind tunnel environment.

SUMMARY OF THE INVENTION

Accordingly, it is an object of this invention to provide a multiple pressure measuring system which does not require the use of moving mechanical parts in operation.

It is another object of the invention to provide a multiple pressure measuring system in which electronic switching times determine the speed in which the measurements may be taken in use of the system.

It is still another object of the invention to provide a package for use in such a pressure measuring system in which pressure measuring sensors which require repair or replacement can be readily interchanged under field conditions.

It is still another object of the invention to provide a configuration for such a system which will allow about a thousand different pressure transducers to be scanned at a rate of 80,000 samples per second.

It is a still further object of the invention to provide such a system in which a small number of cables interconnect the units comprising the system.

It is yet another object of the invention to provide a multiple pressure measuring system in which calibration of pressure measuring transducers in the system remains valid over substantial variations in ambient temperature during pressure measurements.

The attainment of the foregoing and related objects may be achieved through use of the novel electronic scanning pressure system and transducer package for such a system herein disclosed. The electronic scanning pressure measuring system of this invention includes a plurality of pressure transducers. A means for obtaining an electrical signal indicative of a pressure measurement from each of said plurality of pressure transducers is provided. A multiplexing means is connected for selectively supplying inputs from the plurality of pressure transducers to the signal obtaining means. A data bus connects the plurality of pressure transducers to the multiplexing means. A latch circuit is connected to supply control inputs to the multiplexing means. An address bus is connected to supply an address signal of a selected one of the plurality of pressure transducers to the latch circuit. In operation, each of the pressure transducers is successively scanned by the multiplexing means in response to address signals supplied on the address bus to the latch circuit.

In another aspect of the invention, a pressure transducer for the invention includes a flexible pressure-sensitive diaphragm with two integrated strain gages connected as a half-bridge circuit. The diaphragm is supported by a header and contained within an enclosure having two opposed openings. One opening allows the diaphragm to communicate with a first pressure (the pressure under test) and the second opening allows the opposite side of the diaphragm to be exposed to a second pressure, which constitutes a base line or reference pressure. The strain gage half-bridge circuit produces an electrical signal representative of the difference between the two pressures.

In another aspect of the invention, a packaged array of such pressure transducers includes a first substantially planar plate having an array of apertures extending therethrough from a first surface to a second surface. A first frame is connected to the first surface of the plate and surrounds an area of the first surface including the array of apertures. An array of pressure transducers corresponding in number to the array of apertures is contained within the area bounded by the first frame. Each of the transducers is connectable through the apertures to a pressure to be measured. There is a printed circuit board having a first side on which the array of pressure transducers is detachably mounted. The printed circuit board is mounted against the first frame so that the first plate, first frame and printed circuit board form a sealed enclosure containing the array of pressure transducers. The package further preferably includes a heater plate on the first surface within the area bounded by the first frame, the heater plate also having an array of apertures in registry with the apertures in the planar plate. Each transducer is then connected through both arrays of apertures to a pressure to be measured. It is also preferred to connect a hybrid electronics module on the second side of the printed circuit board, and to have a cover bonded to the printed circuit board to form, together with the printed circuit board, an enclosure for the hybrid electronics module. It is especially preferred to provide an additional pressure transducer with a diaphragm that is only exposed to the internal package pressure. This transducer provides a non-pressure-sensitive half-bridge circuit to complete the half-bridge circuits of the other pressure transducers.

In its preferred form the package includes the elements of a pressure measuring system as described above. A plurality of such pressure measuring system packages are then connected in a complete electronic scanning pressure measuring system, in which the plurality of pressure measuring packages are each connected by means of a common analog data bus to an analog to digital (A/D) converter. Each pressure measuring package is connected to a common address bus. A data processor is connected to receive digital signals from the A/D converter and to supply synchronization signals to the A/D converter. Slave circuits within the A/D converter generate local address signals to the plurality of pressure measuring packages on the address bus.

The attainment of the foregoing and related objects, advantages and features of the invention should be more readily apparent to those skilled in the art, after review of the following more detailed description of the invention, taken together with the drawings, in which:

BRIEF DESCRIPTION OF THE DRAWINGS

FIG. 1 is a block diagram of a pressure measuring system in accordance with the invention.

FIG. 3 is an exploded side view of the module package shown in FIG. 2.

FIG. 4A is a cross-ection view taken along the line 4—4 in FIGS. 2 and 3.

FIG. 4B is a schematic diagram of the transducer shown in FIG. 4A.

FIGS. 5 and 6 are block diagrams of a pressure measuring system in accordance with the invention.

DETAILED DESCRIPTION OF THE INVENTION

Figure 2:
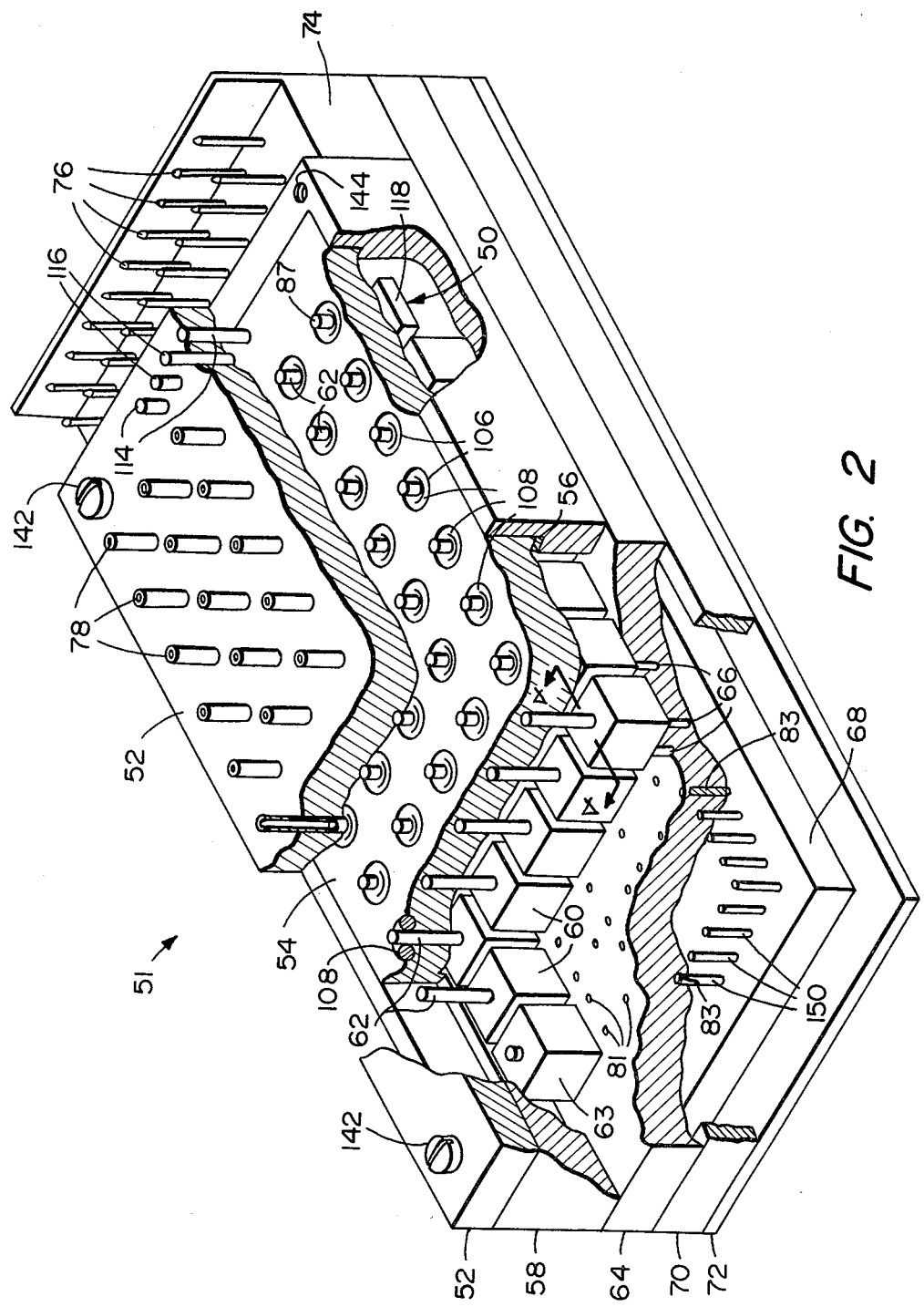
FIG. 2 is a perspective view of a module package for use in the system of FIG. 1.

Turning now to the drawings, more particularly to FIG. 1, there is shown a functional block diagram of a pressure transducer module in accordance with the invention. A 48-line bus 10 is connected to supply pressure signals from pressure transducers (not shown), to be described more fully below, to a 48-channel multiplexer circuit 12. A 6-bit digital bus 14 is connected to provide an address input to latch circuit 16. A strobe control line 18 is also connected to the digital latch circuit 16 to provide a clock pulse for controlling sampling of information on digital bus 14. Bus 20, consisting of six latched control lines, connects the digital latch circuit 16 and the multiplexer circuit 12. The multiplexer circuit 12 provides one input to a differential amplifier circuit 22 on line 24. Line 26 provides a reference voltage to one input of differential amplifier 22. Resistors R1 and R2 are connected between a positive voltage source, +V, and ground. The half-bridge circuit of R1 and R2 represents the half-bridge strain-gage circuit of deactivated pressure transducer 63 (see FIG. 2). The half-bridge circuit of FIG. 1 and the half-bridge circuit of each active pressure transducer 60 (see FIGS. 2 and 4B) form a full-bridge circuit. The differential amplifier circuit 22 is connected to analog switches 28 by lines 30 and 32. Output lines 34 and 36 from the analog switches 28 provide an analog output from the module. Control line 38 provides a module output select strobe control signal for operating the analog switches 28. The analog switches 28 allow for busing of outputs from many pressure modules each incorporating circuits as in FIG. 1.

FIG. 2 shows a pressure measurement module 51 in accordance with the invention, with a partial cutaway to show interior detail. The module 51 includes a pressure coupling assembly 52. Disposed beneath the pressure coupling assembly 52 is a heater plate 54. The heater plate 54 rests on a gasket seal 56. The pressure coupling assembly 52 rests on a transducer frame 58, and the heater plate 54 and gasket 56 rest within the transducer frame 58. The transducer frame 58 encircles pressure transducers 60 having electrical connector pins 66 which are received by sockets 81 on the upper side of printed circuit board 64. Pressure coupling assembly 52 is fastened to frame 58 by means of screws 142 received in threaded apertures 144. The transistor frame is large enough to encircle 50 transducers 60 (five rows with ten to a row); however, only 48 transducers with stem 62 are detachably mounted onto printed circuit board 64. A forty-ninth transducer 63 is also plugged into printed circuit board 64. It is identical to transducers 60 except that it does not have a stem 62. The diaphragm of the forty-ninth unit sees the same pressure on each side, namely the pressure within module 51. The half-bridge strain-gage circuit on the diaphragm of the forty-ninth unit 63 is thus not pressure sensitive. The half-bridge circuit of the forty-ninth unit is used to provide the half-bridge circuit depicted in FIG. 1 with resistors R1 and R2. Inasmuch as only 49 pressure transducers are employed, a vacancy is left on the printed circuit board. Hereinafter, that vacancy is referred to as position 50.

The stems 62 of the 48 transducers 60 extend through heater plate 54 and mate with tubes 78 which are supported by pressure coupling assembly 52. Thus, whatever pressure is introduced into the top (as seen in FIG. 2) of tube 78 is channeled via tube 78 and stem 62 to one side of diaphragm 120 in pressure transducer 60 (see FIG. 4A). There is no tube 78 for the forty-ninth transducer 63. The regions of the pressure assembly coupling assembly 52 and heater plate 54 directly over the forty-ninth transducer 63 are made solid so that the transducer 63 is only exposed to the internal pressure of module 51. A tube 87 passes through and is supported by heater plate 54 over location 50. Tube 87 couples with a tube 78 in the same manner as stems 62. The conduit afforded by tube 87 and its tube 78 permits a reference calibration pressure to be introduced into the interior of module 51.

A hybrid electronics module 68 has electrical connector pins 150 that engage in sockets 83 (see also FIG. 3) on the underside of printed circuit board 64. Printed circuit board 64 has circuits on both upper and lower surfaces and some feed-through connections. The circuit of FIG. 1 is contained within module 68 and printed circuit board 64. A hybrid circuit frame 70 and a cover 72 enclose the hybrid electronics module 68. A header 74 with electrical connector pins 76 is fastened to one end of transducer frame 58. The lower end of pins 76 are soldered to plated-through holes 84 in printed circuit board 64 (see FIG. 3).

Figure 6:
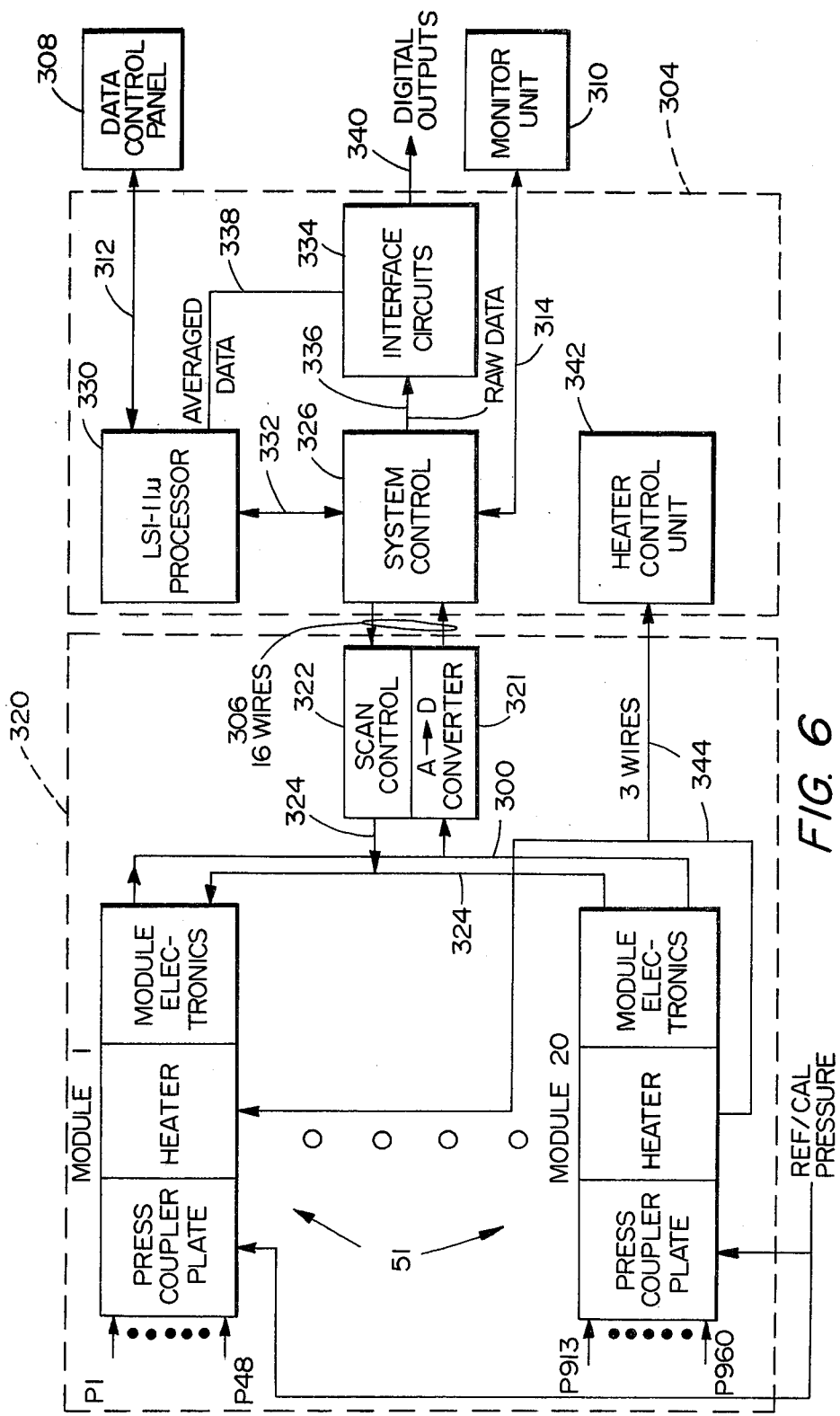

The interior of module 51 is heated by a heater element within heater plate 54 and the temperature is tightly regulated by heater control unit 342 (see FIG. 6). A temperature monitoring thermistor 118 comprises an element in control unit 342 and the thermistor 118 is situated within module 51, preferably in the void between heater plate 54 and printed circuit 64 at location 50. Electrical connector pins 114 enable the heater to be connected to heater control unit 342. Likewise, connector pins 116 enable the thermistor 118 to be coupled to heater control unit 342.

It can be seen that module 51 is a self-contained package for both the pressure transducers 60, and their associated electronics, as shown in FIG. 1. Should a malfunction in the module 51 occur, the module can be readily opened and the hybrid electronics module 68 or any pressure transducer 60 can be easily replaced with a spare unit. If need be, the entire module 51 can be quickly disconnected and replaced with another module.

FIG. 3 shows further details of construction of the module 51. The pressure coupling assembly 52 consists of a metal plate 100 having an array of 49 pressure port apertures 102. The hollow pressure terminating rods 78 are brazed to the top of plate 100 at each pressure port 102. A Lexan or other suitable plastic plate 104, containing another array of 49 mating pressure ports 103, is bonded to the underside of pressure coupler plate 100. The Lexan plate 104 serves as a thermal barrier to minimize heat loss through the pressure coupler plate 100. Heater plate 54 contains a heater element for the module 51. Heater plate 54 also has an array of apertures 110 in alignment with ports 103. Upper section 106 (see also FIG. 2) of aperture 110 constitutes a seat for an O-ring 108. The upper portion of stem 62 of each transducer 60 is permitted to pass through one of the apertures 110, and O-ring 108 effects a hermetic seal between stem 62 and tube 78. A set of connector pins 114 for the heater element in heater plate 54 (see also FIG. 2) is provided at one end of the heater plate 54. A thermistor heat sensor 118 is mounted to the heater plate 54 over position 50. The gasket seal 56, transducer frame 58, printed circuit board 64, hybrid circuit frame 70, hybrid electronics module 68, cover 72 and printed circuit board header 74 complete the assembly as shown.

FIG. 4A shows details of the pressure transducers 60. It is preferred that the strain gage half-bridge be integrated with diaphragm 120 using known techniques of transistor and integrated circuit manufacture. For example, the diaphragm may be a silicon wafer with two connected silicon piezoresistive elements formed integral to the wafer by a process of solid state diffusion. Silicon is an excellent transducer material combining a high elastic modulus with a low density. Further, silicon is a perfectly elastic material which will not deform in a plastic manner. Silicon allows the fabrication of a pressure sensor with low hysteresis and good static performance. By making both the diaphragm and piezoresistive elements from silicon there exists a minimum of stresses due to thermal expansion mismatch of materials. The two piezoresistive elements are connected in series to form a half-bridge. The diaphragm 120 is bonded to header 122, and wires 124 connect the three half-bridge circuit points respectively to three header feed-through pins 66. Cover 126, which includes the stem 62, is bonded to the header 122 to complete the pressure transducer 60. Header 122 has an opening 123 to provide pressure access to one side of the pressure sensing element 120. Stem 62 provides pressure access to the other side of the pressure sensing element 120.

FIG. 4B shows a circuit schematic for the transducer 60. The half-bridge strain-gage circuit integrated within diaphragm 120 is represented by resistors R3 and R4. Resistor R3 is connected between a positive voltage source +V and an output terminal 130 (via pins 66). Resistor R4 is connected between the output terminal 130 and ground. The resistors R3 and R4 are piezoresistive so that changes are produced in their resistance values as the pressure differential across diaphragm 120 changes. The resulting voltage changes at output terminal 130 provide analog pressure signals.

Pressure transducer frame 58 of the module 51 shown in FIG. 3 provides several functions. A reference pressure cavity 140 is formed by the underside of heater plate 54, inner walls of the top frame 58 and the top side of the printed circuit board 64 (FIG. 3). This cavity 140 contains the array of 48 active pressure transducers 60, and one deactivated pressure transducer 63, which is used to provide the R1/R2 half-bridge circuit. The pressure of cavity 140 is supplied through aperture 123 to one side of the diaphragm 120 of each active pressure transducer 60, and to both sides of the diaphragm 120 in transducer 63. A seat for the heater plate 54 is machined into the top of transducer frame 58. The gasket seal 56 is compressed during assembly between the transducer frame 58 and the underside of the heater plate 54. The resulting cavity 140 is pressurized through tube 87 and its associated tube 78. Screws 142 (FIG. 2) mate with corresponding threaded apertures 144 to fasten pressure coupler plate 100 to the transducer frame 58. The transducer frame 58, formed of a suitable glass-epoxy material, also serves as a thermal barrier to prevent heat loss through the sides of the pressure measurement module 51. Transducer frame 58 is bonded to the top surface of the printed circuit board 64 to provide a pressure seal between the frame 58 and the printed circuit board 64. The printed circuit board header 74 provides all electrical connections to module 51. The connecting pins 76 of the header 74 are soldered into plated-through holes 84 at the end of printed circuit board 64 beneath the header 74.

The double-sided printed circuit board 64 also serves several functions. As noted above, it acts as a pressure barrier to seal the bottom of the reference cavity 140. The printed circuit board, desirably about 0.3 cm (⅛inch) thick, also acts as a thermal barrier to minimize heat loss through the bottom of module 51. On the top of the printed circuit board 64, power is distributed to the 48 pressure transducers 60 and the reference transducer of the array. Each transducer 60 plugs into a set of three miniature sockets 81 provided in the printed circuit board 64 for this purpose. Plated-through holes in the printed circuit board 64 route the output terminals 130 of the transducers 60 (FIGS. 4A and 4B) to the hybrid electronics module 68 on the bottom side of printed circuit board 64. A gain set resistor for the amplifier 22 (FIG. 1) in the hybrid electronics module 68 and two thermal compensation resistors, each connected in series with the 49 pressure transducers 60, are mounted to the bottom of printed circuit board 64. Two thermal compensation resistors are used, instead of one, to keep power dissipation within the rating of the individual thermal compensation resistors.

The hybrid circuit frame 70 is bonded to the bottom of printed circuit board 64 in a manner comparable to the bonding of transducer frame 58 to the top of the printed circuit board 64. The frame 70 provides protection for the bottom of the printed circuit board. Screws and threaded apertures are used to fasten cover 72 to the hybrid circuit frame 70.

The pressure measurement module 51 is assembled in a straightforward manner. The individual pressure transducers 60 are fabricated and tested beforehand. The transducer to be used as the reference transducer 63 is deactivated by cutting off stem 62 from its cover 126. When installed in the reference cavity 140, the reference transducer 63 is open to the reference pressure on both sides, i.e., there is no pressure difference across its pressure sensing element 120. Sockets for the transducer pins 66 and pins 150 of the hybrid electronics module 68 are pressed into both sides of the printed circuit board 64, which has been sealed and tested against pressure leaks. The transducer frame 58 and hybrid circuit frame 70 are bonded directly to the printed circuit board 64, using a non-conductive bonding agent. Both frames 58 and 70 are non-conductive glass-epoxy material so that shorting of the traces on printed circuit board 64 is not a problem. The printed circuit board header 74 is installed on the top surface of the printed circuit board 64 and pins soldered from the bottom of the printed circuit board 64. The hybrid electronics module 68 is plugged into appropriate sockets in the bottom of printed circuit board 64. The remaining leads to be connected to the circuit board 64 are soldered to it. The 48 pressure transducers 60 and the reference transducers 63 are plugged into the top of printed circuit board 64, in the area bounded by transducer frame 58. Gasket seal 56 is placed on its seat in the heater plate 54, within transducer frame 58. The heater plate 54 is placed on the gasket seal 56, with the stems of the 48 pressure transducers 60 passing through their respective holes 110 in the heater plate 54. The O-ring seals 108 are placed around each of the protruding stems 62 and also around the reference porthole at position 50 in the heater plate 54. Pressure coupling plate 52 is attached to the transducer frame 58, simultaneously compressing the O-ring seals 108 between their seats 106 in the heater plate 54 and the bottom of pressure coupling plate 52 and compressing the gasket seal 56 between the bottom of the heater plate 54 and the gasket seat in the transducer frame 58. In this manner, a pressure tight reference cavity 140 is produced. The reference transducer 63 is enclosed in the cavity 140. The reference port 123 (FIG. 4A) is open to the reference cavity 140, so that all 48 pressure transducers 60 have the pressure in cavity 140 as a reference. Each transducer 60 measures the pressure difference between the incoming pressure within its stem 62 and the pressure in the reference cavity 140. The assembly is completed by soldering two thermal compensation resistors into the bottom of printed circuit board 64 and plugging a gain set resistor into sockets provided on the bottom of printed circuit board 64 for it, and attaching cover 72 to the hybrid circuit 70.

In operation, each pressure transducer 60 provides an output which is a function of the difference in pressure between the measured pressure, provided by inlet stem 62 and the reference pressure in cavity 140. The reference pressure in cavity 140 is provided externally, through tube 87 and its associated tube 78. The reference port 123 in each transducer 60 is open to the reference pressure cavity 140. The pressure range of the transducers 60 is determined at the time of their fabrication, by the type of integrated diaphragm 120 installed. Temperature stabilization of the transducer output is obtained both by maintaining the transducers at a constant temperature and by placing a thermal compensation resistor in series with the power connection to the transducers 60. Temperature control of the transducers 60 is the primary means of minimizing temperature effects in the transducer outputs. The temperature of heater plate 54 is sensed by thermistor 118 on the heater plate 54. Under external control, the power supplied to the heater is adjusted to maintain the heater plate 54 at a constant temperature. The temperature of the heater plate 54 is kept higher than the ambient temperature, for positive heat control by the heater.

A secondary means of minimizing temperature effects in the transducer output is through use of the thermal compensation resistor. The thermal compensation resistor is physically composed of two low wattage resistors in series, each in series with the power lead to the transducers 60, including the reference transducer. The value of the thermal compensation resistor is set equal to the equivalent resistance of the 49 parallel connected transducers 60. The function of the thermal compensation resistor is to modify the excitation voltage to the transducers 60 in such a way as to minimize the effect of temperature on the transducer outputs. If the temperature of the transducers 60 increases, the output signals for a given input pressure also increase. At the same time, the resistance of each sensor 120 in the transducers 60, as seen by the power source, decreases. This results in an increase in the current level in the power lead to the array of transducers 60. The voltage drop across the thermal compensation resistor increases, reducing the excitation voltage to the array of transducers 60. The reduction in the excitation voltage causes a decrease in the transducer outputs, which counteracts the effect of temperature on the outputs.

The electronics of hybrid electronics module 66, as shown in FIG. 1, operates in the following manner. The multiplexer circuit 12 selects the output of a particular transducer 60 to be amplified. Selection is done by decoding the digital control outputs from the digital latch circuit 16. The six-bit binary output from the latch circuit 16 causes one of the 48 transducer analong output signals to be imputed to amplifier 22 via lead 24. The digital count, on the external digital bus 14, is strobed into the digital latch circuit 16 by the module transducer select strobe. This operation allows many modules 51, each with 48 pressure sensing channels, to use the same external digital bus 14, with the digital count being sequentially strobed into their corresponding digital latch circuits 16 in each pressure module 51 and the pressure signals supplied as selected to a common analog bus, described below.

The differential amplifier 22 has two inputs: the switched analog signal from multiplexer circuit 12 on line 24, and the reference level from the reference transducer 60 on line 26. The gain of amplifier 22 is determined by the value of its gain set resistor, which is accessible from the back of module 51. The output from the selected pressure transducer 60 is referenced to the output from the reference transducer 63. The reference transducer 63 is electrically and physically identical to the selected active pressure transducer 60, i.e., the reference transducer 63 is maintained at the same temperature as the active transducer 60, has the same excitation voltage, and has the same type of sensor as the active transducers.

The analog switches 28, in series with the outputs 30 and 32 of amplifier 22, allow for bussing of the outputs from many pressure modules 51. The module output select strobe gates the output of the transducer module 51 onto an analog bus via outputs 34 and 36, so that the analog bus may service many pressure modules 51.

The electronics for hybrid electronics modules 68, as shown in block diagram form in FIG. 1, may be implemented with commercially available integrated circuits. For example, digital latch circuit 16 can be implemented with a CD4508BH latch circuit and part of a CD4066BH type integrated circuit. The 48 channel multiplexer circuit 12 may be implemented with three CD4067BH type multiplexing circuits and a CD4011BH type NAND buffered series gate integrated circuit. Amplifier 22 may be implemented with two LM108A type operational amplifier integrated circuits. The analog switches 28 may be implemented with portions of the same CD4066BH type integrated circuit not utilized in connection with the digital latch circuit 16. These integrated circuits or their equivalents are available from RCA Corporation, National Semiconductor Corporation, and other integrated circuit suppliers.

FIG. 5 is a block diagram of an electronic scanning pressure measurement system incorporating 20 pressure modules 51 capable of measuring 960 different pressures (P1-P960). The pressure modules 51, labeled PM1-PM20, are "daisy-chained" via flat ribbon cables 300, to an analog-to-digital (A/D) converter 302. The use of cables 300 for interconnection of the pressure modules 51 and the A/D converter 302 allows these components to be placed arbitrarily in model internal cavities for wind tunnel testing purposes. An electronics rack 304 contains an LSI-11 microprocessor, obtainable from Digital Equipment Corporation, Maynard, Massachusetts, power supplies and a heater control. The electronics rack 304 is connected to A/D converter 302 by cable 306. Electronics rack 304 is usually placed outside the wind tunnel. A data control panel 308 and a monitor unit 310 are respectively connected by cables 312 and 314 to the electronics rack 304, and are typically placed in the wind tunnel control room.

FIG. 6 is a more detailed block diagram of the system shown in FIG. 5. As indicated at 320, the pressure modules 51, A/D converter 321 and a scanning controller 322 are all contained within a model to be tested in the wind tunnel. The scanning controller 322 is connected to the modules 51 by cables 324. The scanning control 322 and A/D converter 321 are connected by the cable 306 to a system control 326 in electronics rack 304. The A/D converter module 302 (FIG. 5) contains line receivers, the scanning control circuits 322, a voltage regulator, two differential amplifiers, sample and hold circuits, analog switches, the 12-bit A/D converter 321 and line transmitters. The line receivers in the A/D module 302 amplify clock and synchronization signals from the system control circuits 326 to generate gate signals that control the scan and readout for each pressure module 51. The scan control circuits 322 also control the sampling and digitization of the pressure data on analog bus 300. The voltage regulator provides regulated $+10$ V power to the modules 51. The differential amplifier inputs are connected to analog bus 300 from each pressure module 51. Output from the two differential amplifiers is stored in the sample and hold circuits. The analog switches multiplex outputs from the sample and hold circuits onto the input of the A/D converter 321. Digital data, in serial format, is transmitted by the line transmitters to system control 326 on bus 306. A total of 16 wires is required in bus 306 for system power, scan control, and data.

System control 326 is connected to microprocessor 330 by bus 332 and to interface circuits 334 by bus 336. The microprocessor 330 is also connected to interface circuits 334 by bus 338. Bi-directional bus 312 connects the microprocessor 330 to data control panel 308. The interface circuits 334 provide digital outputs from the system on bus 340. Monitor unit 310 is connected by bidirectional bus 314 to system control 326. A heater control unit 342 is connected by buses 344 to each pressure module 51.

In operation, the system control 326 in electronics rack 304 routes data to microprocessor 330 for recording raw data, and to monitor unit 310 for real time display of selected pressure data. The interface circuits 334 provide optically isolated output data from their buffer memory and from the microprocessor 330 on bus 340 to a wind tunnel data acquisition system (not shown). System control circuits 326 include master scan circuits, input shift register circuits, and display counter circuits. The master scan circuits contain the system clock and the system gate generating circuits. The system gate generating circuits are used to decode and route the data. Pressure data in digital form are received and decoded in the shift register circuits. Position verification circuits in system control 326 check connections to the pressure modules 51. If any modules 51 are not connected, those empty system positions are blanked in a display of monitor unit 310. Switch decode circuits in system control 326 are synchronized by system gate signals and enable panel switches in monitor unit 310 to select data for display. The display counter circuits transmit selected data to monitor unit 310 for display in the wind tunnel control room. Switches and indicators that control the number of samples of pressure data averaged by the microprocessor 330 are included in the data control panels 308, also located in the wind tunnel control room. The number of samples to be averaged at the fixed scan rate is selected to provide adequate integration time to yield the desired accuracy of the pressure measurements.

In practice, the pressure transducers 60 utilized in the system of this invention meet the specifications shown in the following table:

| | |
|---|---|
| OPERATING PRESSURE RANGE | ± 15 psi DIFFERENTIAL |
| GAGE IMPEDANCE | 2,500 ohms ± 20% |
| NUMBER OF GAGE ELEMENTS | 2 |
| EXCITATION | 5 V |
| FULL SCALE OUTPUT (FSO) AT 15 psi | 60 mV ± 3% |
| THERMAL SENSITIVITY SHIFT | (−0.08% ± 03%)/°F. |
| ZERO VARIATION | <± 3% OF FSO |
| THERMAL ZERO SHIFT | <0.025%/°F. |
| NONLINEARITY | <± 0.25% FSO |
| HYSTERESIS | <± 0.05% FSO |
| REPEATABILITY AND ZERO STABILITY AT CONSTANT TEMPERATURE | <± 0.05% FSO |
| OPERATING TEMPERATURE RANGE | −65° F. (−54° C. TO 121° C.) |

Other pressure ranges could be readily interchanged in the modules 51. As shown in the table, one of the unique features of the transducers 60 (FIG. 4A) in the modules 51 of this system is the small variation allowed in full scale output (FSO), i.e., 60 millivolts ±3%. Another noteworthy feature is the small variation in zero offsets, i.e., less than ±3% of FSO. These characteristics eliminate the need to match transducer sensitivities and zero offsets for installation into particular pressure modules to maximize the useful range of the A/D converter for pressure data. Other specifications listed, including the small linearity and hysteresis, are close to present state of the art limits for integrated sensor pressure transducers. Tests indicate that the above specifications are maintained when the temperature external of module 50 is varied from 20° C. to 52° C.

Figure 7:
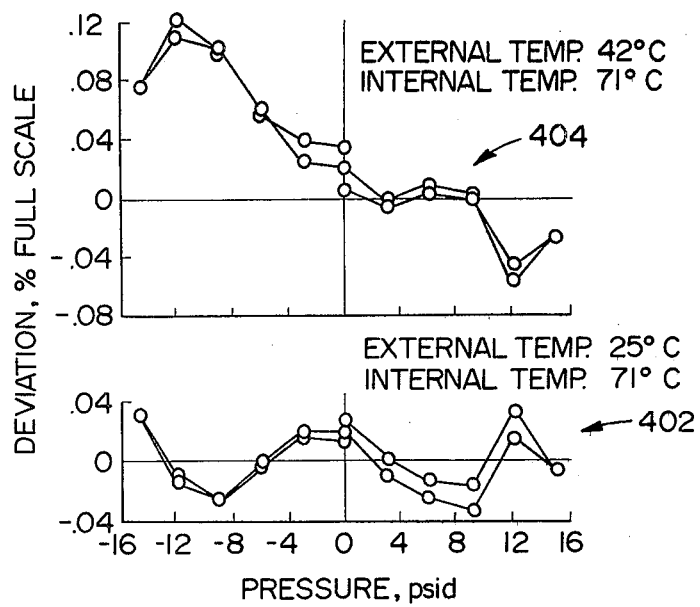
FIG. 7 is performance curves obtained with the invention.

FIG. 7 is performance curves showing results obtained in a calibration of a pressure module 51 in accordance with the invention. The curves 402 represent a room temperature calibration at 25° C. The curves 404 represent a calibration at 42° C., a typical temperature in wind tunnels. The internal temperature of the pressure cavity 140 in the module 51 was maintained at 71° C. in both cases. The curves 402 and 404 show the deviations between calibration pressures and the best fit, third order equation in terms of percent of full scale output (FSO). The calibration pressures were varied from zero pounds-per-square-inch differential (psid) to 15.0 psid, and return to zero psid. The results of the 25° C. calibration show that a base line accuracy better than ±0.04% of FSO is obtained. The hysteresis was typically less than ±0.01% of FSO. The pressure measurements at 42° C., obtained by using the room temperature calibration coefficients, indicate a narrow band from −0.06% of FSO to 0.12% of FSO. The larger error band at 42° C. arises due to temperature gradients within the temperature controlled pressure modules 51.

Figure 8:
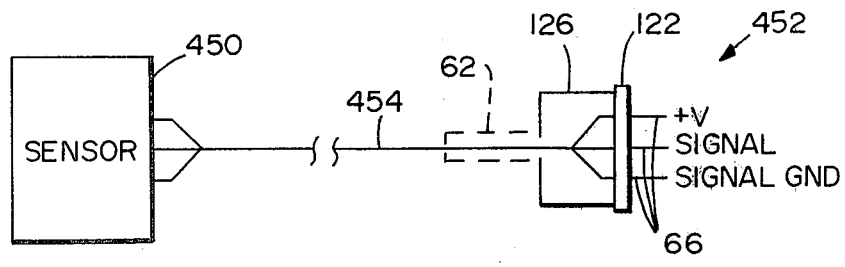
FIG. 8 is a block diagram showing a portion of another embodiment of the invention.

FIG. 8 shows how the pressure module 51 of this invention can be used to multiplex and amplify signals from a variety of different sensors 450. Access to the electronics module 68 (FIG. 2) is obtained by removing the pressure coupling plate 52, the heater plate 54, and the pressure transducers 60. Individual input connectors 452 can be made up, using the transducer header 122 and case 126. For this purpose, stem 62 of the case 126 is cut off. Bus 454 is used to connect a +V, signal and signal ground inputs to the three terminal pins 66 of the input connector 452. Up to 48 different inputs can be wired and plugged into the top of module printed circuit board 64 (FIG. 2) in this manner. A signal reference input can also be wired and substituted for the reference transducer 63. In this manner, even more pressure measurement flexibility can be obtained with the pressure measuring module and multiple pressure measuring system of this invention.

It should now be apparent to those skilled in the art that a novel pressure transducer package and system capable of achieving the stated objects of the invention have been provided. An electronic scanning pressure measuring system configured in accordance with this invention will obtain measurements from about one thousand different pressure transducers at a scan rate of about 80,000 measurements per second, meaning that each transducer can be scanned about 80 times per second. The pressure measuring module of this invention is capable of providing an array of 48 semiconductor strain gauges in a field replaceable and field repairable unit. The strain gauges themselves determine a pressure to be measured against a base line pressure with no mechanical moving parts required to take the measurements or in the scanning by the system. While the system and package of this invention is especially adapted for use in making a multiplicity of measurements in wind tunnel or similar demanding environment, its capabilities should allow its use in a wide variety of other environments as well.

It should further be apparent to those skilled in the art that various changes in form and details of the invention as shown and described may be made. It is intended that such changes be included within the spirit and scope of the claims appended hereto.

What is claimed is:

1. A pressure system comprising a plurality of pressure transducers, means for obtaining an electrical signal indicative of a pressure measurement from each of said plurality of pressure transducers, multiplexing means connected for selectively supplying inputs from said plurality of pressure transducers to said signal obtaining means, a data bus connecting said plurality of pressure transducers to said multiplexing means, a latch circuit connected to supply control inputs to said multiplexing means, an address bus connected to supply an address signal of a selected one of said plurality of pressure transducers to said latch circuit, said signal obtaining means comprising a differential amplifier receiving a first signal from one of said pressure transducers as a first input and a second signal from a predetermined one of said pressure transducers constituting a reference transducer as a second input, the differential amplifier producing as an output, based on said first and second signals, the electrical signal indicative of the pressure measurement.

2. The pressure measurement system of claim 1 in which said plurality of pressure transducers comprise diaphragm members each having a first side in contact with a pressure cavity and a second side in contact with a pressure to be measured.

3. The pressure measuring system of claim 2 in which said plurality of pressure transducers further comprise an additional diaphragm serving as a reference transducer and having both a first side and a second side in contact with the pressure cavity.

4. The pressure measuring system of claim 2 further comprising a heating means for maintaining the pressure cavity at a predetermined temperature.

5. The pressure measuring system of claim 4 in which the heating means comprises a heater plate in the pressure cavity, a thermistor in the pressure cavity and a control circuit operatively connecting said thermistor and said heater plate.

6. A package comprising a first substantially planar plate having an array of apertures extending therethrough from a first surface to a second surface, a first frame connected to the first surface of said plate and surrounding an area of the first surface including the array of apertures, an array of pressure transducers corresponding in number to the apertures in said planar plate and contained within the area bounded by said first frame, each of the transducers being connectable through the apertures to a pressure to be measured, a printed circuit board having a first side on which said array of pressure transducers is mounted, said printed circuit board being mounted against said first frame so that said first plate, first frame and printed circuit board form a sealed enclosure containing said array of pressure transducers.

7. The package of claim 6 additionally comprising a heater plate on the first surface within the area bounded by said first frame, said heater plate having an array of apertures in registry with the apertures in said planar plate, and each of the transducers being connected through the apertures in said planar plate and said heater plate to a pressure to be measured, a thermistor mounted in the sealed enclosure, and a control circuit operatively connecting said heater plate and said thermistor.

8. The package of claim 6 in which each of said pressure transducers is mounted on said printed circuit board by means of a plurality of pins which are pluggable and unpluggable into and from mating sockets on said printed circuit board.

9. The package of claim 6 additionally comprising a circuit package mounted on a second side of said printed circuit board and a cover bonded to said printed circuit board to form, together with said printed circuit board, an enclosure for said integrated circuit package.

10. The package of claim 9 in which said circuit package and each of said pressure transducers are mounted on said printed circuit board by means of a plurality of pins which are pluggable and unpluggable into and from mating sockets on said printed circuit board.

11. The package of claim 6 further comprising a reference pressure transducer connected only to receive pressure within the sealed enclosure and providing a reference signal for comparison with signals produced by said array of pressure transducers.

12. An electronic scanning pressure measuring system including a plurality of pressure measuring modules each having an output coupled to an analog bus;
each pressure measuring module comprising, a plurality of pressure transducers for generating analog signals proportional to sensed pressures, means for amplifying said pressure transducer signals, multiplexing means coupled to said pressure transducers and said amplifying means for selectively switching said pressure transducer signals to said amplifying means,
analog switch means for controlling the flow of amplified pressure transducer signals to said analog bus, and a latch circuit coupled to said multiplexing means, each analog switch means and each latch circuit having a strobe input;
means including a digital address bus for sequentially supplying address signals to said latch circuits, means coupled to said latch circuit strobe inputs for sequentially strobing each latch circuit and means coupled to each analog switch means strobe input for strobing each analog switch whereby pressure transducer signals are successively amplified and applied to said analog bus in series format.

13. An electronic scanning pressure measuring system as set forth in claim 12 wherein said amplifying means includes a differential amplifier receiving a first signal from one of said pressure transducers as a first input and a second signal from a predetermined one of said pressure transducers constituting a reference transducer as a second input, said differential amplifier producing as an output, based on said first and second inputs, an analog signal representative of the pressure measured by said pressure transducer coupled to said first input.

* * * * *